3,591,573
REACTION PRODUCTS OF PETROLEUM HYDRO-
CARBON-INSOLUBLE PINE WOOD RESIN AND
PROPYLENE OXIDE
Jay B. Class, Wilmington, Del., assignor to Hercules
Incorporated, Wilmington, Del.
No Drawing. Continuation-in-part of application Ser. No.
630,552, Apr. 13, 1967, which is a continuation-in-part
of application Ser. No. 435,348, Feb. 25, 1965. This
application Nov. 7, 1968, Ser. No. 774,214
Int. Cl. C09f 1/04
U.S. Cl. 260—103  2 Claims

ABSTRACT OF THE DISCLOSURE

A resinous reaction product is prepared by reacting a petroleum hydrocarbon-insoluble pine wood resin and propylene oxide. The resinous reaction product is substantially free of polyether chains.

---

This application is a continuation-in-part of application Ser. No. 630,552, filed Apr. 13, 1967, which in turn is a continuation-in-part of application Ser. No. 435,348, filed Feb. 25, 1965 both now abandoned.

This invention relates to water-insoluble resinous reaction products derived from a petroleum hydrocarbon-insoluble pine wood resin and propylene oxide, and to the method for preparing the same.

The petroleum hydrocarbon-insoluble pine wood resin used in this invention is obtained in connection with the production of wood rosin from pine wood. It comprises a residue low in abietic acid remaining after the separation of refined rosin high in abietic acid from the resinous material obtained by extraction of pine wood with a solvent capable of extracting the petroleum hydrocarbon-insoluble resin component, and is a highly complex mixure of organic compounds, containing as the predominant functional groups, carboxyl groups and phenolic hydroxyl groups. The production of petroleum hydrocarbon-insoluble pine wood resin will be discussed more fully hereinafter.

Resinous reaction products derived from petroleum hydrocarbon-insoluble pine wood resin and ethylene oxide have been prepared heretofore (see U.S. Pat. 2,555,901). Those reaction products generally contain polyether chains at the functional groups of the petroleum hydrocarbon-insoluble pine wood resin. In addition, the prior art ethylene oxide-petroleum hydrocarbon-insoluble pine wood resin reaction products generally contain a small amount of the alkaline catalyst used in the reaction. The presence of either the catalyst or the polyether chains or both in the resinous reaction product will increase the water sensitivity of the product, due to their hydrophilic nature.

The presence of alkaline catalyst in the reaction product is also undesirable because it will initiate premature curing in a number of prepolymer systems comprising copolymers and interpolymers of ethylene oxide-petroleum hydrocarbon-insoluble pine wood resin reaction products and other polymerizable materials. It is completely unfeasible to remove the catalyst from the reaction product before it is put to further use.

It has been found that resinous reaction products derived from propylene oxide and petroleum hydrocarbon-insoluble pine wood resin in accordance with this invention have none of the foregoing disadvantages of the prior art ethylene oxide reaction products, and, in addition, have other unexpected advantages over the prior art ethylene oxide-petroleum hydrocarbon-insoluble pine wood resin reaction products.

The resinous reaction products of this invention are derived from the reaction of petroleum hydrocarbon-insoluble pine wood resin and from about 5% to about 40%, and preferably from about 12% to about 35%, by weight of the pine wood resin of propylene oxide. The resinous reaction products comprise hydroxypropylated petroleum hydrocarbon-insoluble pine wood resins and are characterized by being substantially water-insoluble, by being essentially neutral (acid numbers of 0 to about 12), by having drop softening points between about 50° C. and about 95° C., and by having "hydroxyl contents" of from about 6% to about 8.5%. The resinous reaction products of this invention are free of polyether groups and contain no alkaline catalyst.

The term "hydroxyl content" can be defined as follows.

$$\frac{\text{Weight of hydroxyl units in reaction product}}{\text{Weight of total reaction product}} \times 100 = \text{percent hydroxyl content}$$

The resinous reaction products of this invention have much lower softening points and viscosities than the prior art ethylene oxide-pine wood resin reaction products containing comparable amounts of alkylene oxide. and hence are much easier to handle and blend and the like. The lower viscosities of the instant compositions are particularly important.

Further, it is possible to incorporate larger amounts of the instant resinous reaction products into blends with other resins than is possible with the prior art ethylene oxide-pine wood resin reaction products; and the instant products also yield less heat of reaction than ethylene oxide-pine wood resin reaction products.

The pine wood resin used in accordance with the present invention can be defined as the substantially petroleum hydrocarbon-insoluble pine wood resin prepared, for example, in accordance with the processes described in U.S. Pats. 2,193,026; 2,221,540; and 2,555,901, or by equivalent processes which separate the petroleum hydrocarbon-insoluble pine wood resin from rosin. This material, which is characterized herein by the terms "petroleum hydrocarbon-insoluble pine wood resin" or "the pine wood resin," is a resinous material which can be prepared from pine wood as follows: The pine wood, which may or may not have been steamed to remove volatile constituents such as turpentine and pine oil, is extracted with a coal tar hydrocarbon such as benzene or toluene, or other suitable extraction solvent, and the extract then freed of volatile constituents, leaving a residue consisting of a mixure of wood rosin and the resin used in this invention. Extraction of this mixture with a petroleum hydrocarbon such as, for example, gasoline, dissolves and removes the rosin, which has a high abietic acid content. The remaining resinous material, which is low in abietic acid, is the resin used in this invention.

Alternatively, the material obtained on evaporation of the coal tar hydrocarbon extract can be dissolved in a mixture of furfural and a petroleum hydrocarbon such as gasoline, and the two layers which form can be separated, in which case the substantially petroleum hydrocarbon-insoluble resin is found dissolved in the furfural phase from which it can be obtained by the evaporation of the furfural. Other methods of isolating the desired petroleum hydrocarbon-insoluble pine wood resin can be employed, if desired.

The pine wood resin used in the present invention exhibits a dark red-brown color, and is substantially insolube in petroleum hydrocarbons. It will vary somewhat in its specific characteristics such as acid number, melting point, exact petroleum ether solubility, and content of naphtha-insoluble and toluene-insoluble material, depending upon the particular extraction and rosin separation methods used. This resin will meet or nearly meet the following specifications, namely, substantial insolubility in petroleum hydrocarbons, substantially complete solubility in alcohols, a methoxy content of from about 3% to about 7.5% (generally from about 4% to about 6%), an acid number (standard benzene-isopropanol method) of from about 90 to about 110, and a drop melting point between about 95° C. and about 125° C. ("Hercules drop method"—described in U.S. Pat. 2,138,193 to Peterson). The pine wood resin, chemically, is a highly complex mixture of organic compounds, the functional groups of which are predominately carboxyl groups and phenolic hydroxyl groups.

The pine wood resin-propylene oxide reaction in accordance with this invention is carried out without a catalyst. The use of a catalyst results in the formation of polyether chains at the functional groups of the pine wood resin, which increase the water sensitivity of the resulting resinous reaction product. Further, the catalyst cannot be feasibly removed from the reaction product, and its presence also increases water sensitivity and, in addition, interferes with some desirable uses of the reaction product.

An inert solvent for the pine wood resin can be added with the reactants to increase the fluidity of the charge. However, this is unnecessary when the reaction is carried out at 150° C. or higher, because the pine wood resin is sufficiently fluid at these temperatures. Further, the reaction product has a much lower melting point than the pine wood resin itself, and thus the fluidity of the charge-product mixture increases as the reaction proceeds. Since the reaction is generally carried out at a temperature in excess of 150° C., it is usually conducted in the absence of a solvent. If a solvent is desired, any solvent which does not react with the propylene oxide or pine wood resin, under the reaction conditions employed, can be used. Suitable solvents include benzene, toluene, dioxane, mixtures of any two or more of such solvents, and the like. The solvent can be removed from the reaction product by distillation or any other suitable method.

Charge to reaction will be at least about 5 to about 40 parts propylene oxide for each 100 parts pine wood resin. About 12-35 parts propylene oxide per 100 parts pine wood resin are preferred. These components react to add propylene oxide groups to the carboxyl and phenolic hydroxyl groups of the pine wood resin, thereby forming hydroxypropyl groups at these substituents. This reaction is carried out in the absence of catalyst at an elevated temperature and superatmospheric pressure. When no solvent is used, the reaction temperature can be varied between about 120° C. and about 200° C. Temperatures above about 200° C. can cause decomposition of the pine wood resin reactant, and are not desirable. Reaction temperatures between about 160° C. and about 200° C. are preferred, since the rate of the reaction becomes appreciably slower when it is carried out at a temperature below about 160° C. Lower temperatures can be used when a solvent is present in the reaction system. The reaction is carried out at superatmospheric pressure, up to about 225 p.s.i.g. or higher. Thus, pressures between about 15 p.s.i.a. and about 225 p.s.i.g. may be used, with a pressure range of about 100 p.s.i.g. and about 200 p.s.i.g. being preferred After the propylene oxide, or an increment thereof, is added to the reaction mixture, the pressure is allowed to decrease autogenously while the reaction proceeds.

The products of this reaction are essentially neutral resins, having acid numbers of about 12 or less. They generally have drop softening points between about 60° C. and about 95° C., although drop softening points as low as 50° C. may be exhibited. The resinous reaction products have hydroxyl contents between about 6-8.5% and are free of polyether groups.

The resinous reaction products of this invention are useful as ingredients of synthetic foams and as components of protective coatings for various substrates, such as metals, paper, wood, and the like. They are also useful as components of floor tile resins and in other plastics applications, for example, as the alcoholic constituent of various polyester resin systems.

The process and products of the present invention are illustrated by the following examples. All parts and percentages referred to therein are by weight unless otherwise specifically indicated.

EXAMPLE 1

A twenty gallon stainless steel jacketed autoclave fitted with an inlet tube and a propeller-type agitator was charged with 68.0 pounds of petroleum hydrocarbon-insoluble pine wood resin. The autoclave was flushed with nitrogen and heated to 190° C. Propylene oxide was added in two to four pound increments by pumping, while the temperature of the reaction mass was maintained at 180-190° C. The maximum pressure was 160 p.s.i.g., and it was allowed to fall autogenously to about 100 p.s.i.g. after the addition of each increment of propylene oxide, before the next increment was added. After twenty-five pounds of propylene oxide had been added over a period of about 2¼ hours, the pressure no longer dropped. Additional propylene oxide, bringing the total to 51 pounds, was pumped in over the next two hours, but no additional pressure drop was incurred. At this point, the pressure was 210 p.s.i.g. and the temperature was 183° C. The total charge was held for another two hours at reaction conditions, and the final pressure was 215 p.s.i.g. at 190° C. The charge was cooled to 150° C. and the autoclave was vented and flushed three times with nitrogen at 150 p.s.i.g. The resulting product weighed 91.7 pounds. The resinous reaction product was a soft resin at room temperature, which had an acid number of 0, a hydroxyl content of 8.0%, and a drop softening point of 65° C.

EXAMPLE 2

A stainless steel pressure autoclave which was fitted with external electrical heating, an internal cooling coil, an agitator, a pressure gauge, a thermometer well and an inlet tube, was charged with 500 parts petroleum hydrocarbon-insoluble pine wood resin. The autoclave was flushed with nitrogen and heated to 185° C. Propylene oxide was added in 25 to 50 part increments, by pumping, for a period of 3.6 hours. A total of 375 parts of propylene oxide was added during this period, while the temperature was maintained at 180-190° C. and the maximum pressure was 225 p.s.i.g. The charge was held at reaction conditions for an additional 7.2 hours, with the pressure gradually decreasing autogenously to 180 p.s.i.g. and remaining constant there for the final hour. The charge was cooled to 150° C., and the autoclave was vented and flushed with nitrogen. The reaction product was 671 parts of a soft resin, having an acid number of 6, a hydroxyl content of 7.6%, and a drop softening point of 73° C.

EXAMPLES 3-9

The equipment and procedures used in these examples were the same as those used in Example 2. The amount of reactants used, reaction conditions and product characteristics are described in Table 1, set forth hereinafter. In each example the pressure was allowed to decrease autogenously after the addition of each increment of propylene oxide. After all the propylene oxide was added, the charge was maintained at reaction conditions for a sufficient time to allow the reaction to be completed. Completion of the reaction was indicated by the pressure remaining constant without further decrease for a period of about one hour.

| Time of addition (approx.) | Amount added, grams | Pressure after addition, p.s.i.g. | Pressure at beginning of addition, p.s.i.g. |
|---|---|---|---|
| (1) Initial | 115 | 170 | |
| (2) 9 min. after initial | 30 | 200 | 155 |
| (3) 32 min. after (2) | 25 | 200 | 155 |
| (4) 15 min. after (3) | 10 | 210 | 180 |
| (5) 21 min. after (4) | 10 | 200 | 180 |
| (6) 17 min. after (5) | 10 | 200 | 180 |
| (7) 27 min. after (6) | 20 | 205 | 180 |
| (8) 28 min. after (7) | 25 | 205 | 180 |
| (9) 45 min. after (8) | 35 | 200 | 175 |
| (10) 30 min. after (9) | 35 | 200 | 180 |

TABLE 1

| Ex. No. | Amount pine wood resin, parts | Propylene oxide added, parts | Time used for addition of propylene oxide, hrs. | Time charge held at reaction conditions after addition of all propylene oxide, hrs. | Reaction temperature, °C. | Maximum reaction pressure, p.s.i.g. | Final pressure, p.s.i.g. | Amount of product, parts | Product, acid No. | Product hydroxyl content, percent | Product drop softening point °C. |
|---|---|---|---|---|---|---|---|---|---|---|---|
| 3 | 500 | 290 | 1.4 | 7.4 | ¹ 180–190 | 175 | 120 | 676 | 5 | 8.2 | 68 |
| 4 | 500 | 210 | 2.8 | 4.0 | ² 175–185 | 190 | 155 | 646 | 4 | 8.0 | 78 |
| 5 | 500 | 145 | 0.4 | 3.1 | 160–170 | 100 | 40 | 594 | 8 | 7.2 | 87 |
| 6 | 500 | 145 | 0.8 | 1.5 | 160–170 | 85 | 0 | 560 | 0 | 6.2 | 91 |
| 7 | 500 | 125 | 0.8 | 1.7 | 165–170 | 65 | 0 | 585 | 0 | 6.7 | 85 |
| 8 | 500 | 85 | 0.6 | 2.1 | 165–170 | 70 | 40 | 576 | 0 | 6.9 | 87 |
| 9 | 500 | 165 | 1.1 | 6.2 | 170–180 | 160 | 90 | (³) | 11.0 | 7.2 | 70 |

¹ Initial exotherm to 205° C.
² Initial exotherm to 202° C.
³ Part of product lost—no accurate weight could be obtained.

EXAMPLE 10

A stainless steel pressure autoclave which was fitted with external electrical heating, an internal cooling coil, an agitator, a pressure gauge, a thermometer well, and an inlet tube was charged with 300 grams of petroleum hydrocarbon-insoluble pine wood resin. The autoclave was flushed with nitrogen and the contents thereof heated to about 190° C. Propylene oxide was added to the autoclave in increments at times and pressures as set forth below. Autoclave temperature was maintained at about 190° C.

| Time of addition (approx.) | Amount added, grams | Pressure after addition, p.s.i.g. | Pressure at beginning of addition, p.s.i.g. |
|---|---|---|---|
| (1) Initial | 120 | 120 | |
| (2) 23 min. after initial | 79 | 180 | 85 |
| (3) 48 min. after (2) | 29 | 200 | 165 |
| (4) 73 min. after (3) | 21 | 200 | 180 |
| (5) 165 min. after (4) | 25 | 200 | 180 |

After the final addition of 25 grams of propylene oxide, the pressure in the autoclave 58 minutes later read 190 p.s.i.g. The pressure gauge was observed 2 hours and 48 minutes after the 190 p.s.i.g. reading and showed a pressure of 185 p.s.i.g. Thirty-eight (38) minutes later the pressure was still at 185 p.s.i.g. No further reading was taken.

The resin product was removed from the autoclave and weighed. The product weighed 415 grams which indicated 115 grams of propylene oxide reacted with 300 grams of pine wood resin before essentially no further reaction took place as evidenced by the above pressure gauge readings.

EXAMPLE 11

Example 10 was repeated using ethylene oxide in place of propylene oxide. The ethylene oxide was added in the following manner to the autoclave.

After addition (10) no more additions of ethylene oxide were made; however, pressure drop was observed as follows, indicating ethylene oxide still reacting.

| Time of observation: | Pressure reading, p.s.i.g. |
|---|---|
| 41 min. after addition (10) | 180 |
| 38 min. after above reading | 155 |
| 62 min. after above reading | 115 |
| 60 min. after above reading | 90 |
| 50 min. after above reading | 82 |
| 60 min. after above reading | 70 |
| 60 min. after above reading | 65 |
| 60 min. after above reading | 60 |
| 45 min. after above reading | 55 |
| 45 min. after above reading | 55 |

After the second 55 p.s.i.g. reading, the contents of the autoclave were removed. The reaction product weighed 474 grams indicating that 174 grams of ethylene oxide had reacted with 300 grams of pine wood resin.

Table 2 below sets forth certain determined properties of the two reaction products.

TABLE 2

| | Propylene oxide, Example 10 | Ethylene oxide, Example 11 |
|---|---|---|
| Acid Number | 0.5 | 4.7 |
| Hydroxyl Number | 227 | 288 |
| Percent hydroxyl | 6.9 | 8.7 |
| Drop softening point, °C | 81 | 69 |
| Water, percent | 0.3 | 0.6 |
| Terminal methyl groups, percent | 10.2 | 2.6 |
| Terminal methyl groups added corrected to exclude pine wood resin, percent | 7.3 | 0.06 |
| Theoretical methyl groups added, percent | 7.2 | 0 |

This invention as described above comprehends the reaction of the pine wood resin and the propylene oxide in the absence of a catalyst. The use of a catalyst results in the formation of polyether chains in the reaction product which render the product hydrophilic, increasing its water sensitivity. Further, a catalyst cannot be removed economically and interferes with some desirable uses of the resin reaction product. It should be noted, however, that the reaction can be carried out in the presence of any addition reaction catalyst if desired. Suitable catalysts include alkali metal hydroxides (sodium hydroxide, potassium hydroxide, and the like), alkali metal salts (sodium carbonate, sodium acetate, potassium carbonate, and the like), alkali metal resinates (the sodium soap of rosin, the sodium soap of petroleum hydrocarbon-insoluble pine wood resin, and the like), alkaline earth metal oxides calcium oxide, barium oxides, and the like), alkaline earth metal hydroxides (barium hydroxide, calcium hydroxide, and the like), alkali metal alkylates (sodium methylate, potassium methylate, sodium ethylate, sodium methoxide, and the like). The amount of such catalyst will be on the order of one part catalyst per one hundred parts pine wood resin.

The resinous reaction products of this invention have particular utility in the manufacture of rigid polyurethane foams.

It is known that rigid polyurethane foams can be made from polyols, polyisocyanate, catalyst, blowing agent (water or low-boiling organic liquid), and surfactant. Thus, the resinous reaction product of this invention, in admixture with a polyol such as pentaerythritol-propylene oxide adduct, reacts with an organic polyisocyanate in the presence of a foaming agent to produce a highly satisfactory polyurethane foam.

The hydroxyls of the resinous reaction product of this invention are secondary hydroxyls. The hydroxyls of the product derived by reacting a petroleum hydrocarbon-insoluble pine wood resin and ethylene oxide are primary hydroxyls. The primary hydroxyls are considerably more reactive than secondary hydroxyls. Thus, the manufacture of rigid polyurethane foams using the pine wood resin-ethylene oxide reaction product means less latitude for the foam maker in controlling reaction exotherm with subsequent untoward effects on foam cell structure, particularly in thick sections.

On the other hand, by use of the resinous reaction product of this invention in the manufacture of rigid polyurethane foam, the foam manufacturer has better control over reaction conditions and can produce highly satisfactory foams.

In addition the viscosity of the resinous reaction product of this invention is lower than the viscosity of the pine wood resin-ethylene oxide reaction product thereby providing a processing advantage for the foam manufacturer.

What I claim and desire to protect by Letters Patent is:

1. A substantially water-insoluble resinous reaction product of a petroleum hydrocarbon-insoluble pine wood resin and propylene oxide derived by reacting, in the absence of a catalyst, a petroleum hydrocarbon-insoluble pine wood resin and from about 5% to about 40% based on the weight of said pine wood resin of propylene oxide at a temperature between about 120° C. and 200° C. and at a superatmospheric pressure of up to about 225 p.s.i.g.

2. A substantially water-insoluble resinous reaction product of a petroleum hydrocarbon-insoluble pine wood resin and propylene oxide in accordance with claim 1 wherein the propylene oxide is employed in an amount between about 12% to 35% by weight of pine wood resin.

References Cited
UNITED STATES PATENTS

| | | | |
|---|---|---|---|
| 3,356,622 | 12/1967 | Delmonte | 260—2.5 |
| 2,555,901 | 6/1951 | Rummelsburg | 260—104 |
| 2,662,881 | 12/1953 | Batdorf | 260—104 |

DONALD E. CZAJA, Primary Examiner

W. E. PARKER, Assistant Examiner

U.S. Cl. X.R.
260—2.5, 104